United States Patent Office 3,565,903
Patented Feb. 23, 1971

3,565,903
PYRANO[2,3-b]QUINOLINES AND PROCESS FOR THEIR PRODUCTION
Maximilian von Strandtmann, White Meadow Lake, Rockaway, Marvin P. Cohen, New Milford, and John Shavel, Jr., Mendham, N.J., assignors to Warner-Lambert Pharmaceutical Company, Morris Plains, N.J., a corporation of Delaware
No Drawing. Filed Nov. 24, 1967, Ser. No. 685,325
Int. Cl. C07d 29/24
U.S. Cl. 260—294.3
3 Claims

ABSTRACT OF THE DISCLOSURE

Substituted pyrano[2,3-b]quinolizines of Formula I

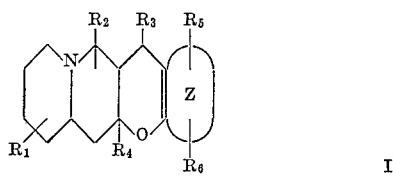

I and the process for their production are disclosed. $R_1$, $R_2$ and $R_3$ are hydrogen, lower alkyl, aralkyl, aryl; $R_4$ is hydroxy, alkoxy or various amino groups; Z is an aromatic or heteroaromatic nucleus; and $R_5$ and $R_6$ represent hydrogen, various amino or alkoxy groups, alkyl, aralkyl, aryl, nitro, carboalkoxy and halogen.

---

The present invention relates to pyrano[2,3-b]quinolizines of the formula:

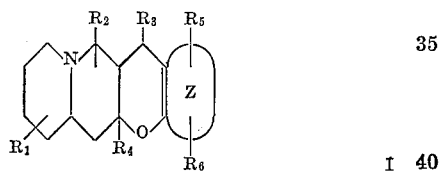

I wherein $R_1$, $R_2$, and $R_3$ are hydrogen, lower alkyl, aralkyl, or aryl; $R_4$ is hydroxy, dialkylamino, lower alkyl aralkyl amino, alkylarylamino, morpholino, piperazino, piperidino, pyrrolidino; Z is an aromatic or heteroaromatic nucleus such as indole, carbazole, benzene, pyridine, quinoline, isoquinoline, naphthaline, phenanthrene, anthracene and coumarin; $R_5$ and $R_6$ represent hydrogen, amino, alkylamino, acylamino, hydroxy, alkoxy, aralkoxy aryloxy, methylenedioxy, alkyl, aralkyl, aryl, nitro, carboxy, carboalkoxy and halogen.

In the above definitions for $R_1$, $R_2$, $R_3$ and $R_4$, lower alkyl and the lower alkyl portions of aralkyl, di-lower-alkylamino and lower alkoxy are meant to include from 1–6 carbon atoms, such as methyl, ethyl, propyl, isopropyl, and the like. Acyl is meant to be a radical derived from a carboxylic radical, preferably that from a lower alkanoyl acid. Halogen is meant to include all four members of its family, that is, chlorine, bromine, fluorine and iodine. Aryl is meant to include monohomocyclic ring systems such as phenyl as well as monoheterocyclic ring systems such as pyridyl, furyl and the like.

The symbols $R_1$, $R_2$, $R_3$, and $R_4$ used hereinafter in the specification and in the claims have the same meaning as defined.

The present invention also embraces within its scope novel processes for the production of the above compounds.

The compounds of this invention exhibit central nervous system depressant activity in mammals. They are useful as tranquilizing agents in mammals such as cats, dogs, mice, rats and the like in tension and anxiety states. Generally speaking, a dose of about 1 to about 3 mg. per kg. body weight of the mammal being treated is administered to produce the desired tranquilizing activity. This dose may be repeated three or four times daily. This dosage regimen may be varied according to individual variations in body weight, sex, age or the species of the mammal being treated according to methods well known to the healing arts. The compounds of this invention exhibit $LD_{50}$ in standard laboratory animals, such as mice, at between about 200 mg./kg. to about 1000 mg./kg. In order to use these compounds, they are combined with inert pharmaceutical excipients, such as lactose, starch, mannitol, dicalcium phosphate and the like, to form oral dosage forms such as tablets, capsules, dispersable powders and the like. They may also be combined with a parenterally acceptable vehicle such as water, saline, to produce dosage forms suitable for parenteral administration.

According to the present invention, the compounds may be produced by a number of procedures as follows:

PROCEDURE A

Compound of structure II

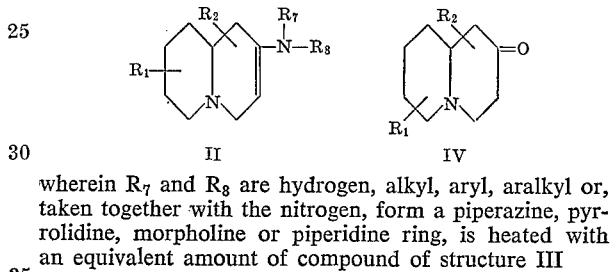

II IV wherein $R_7$ and $R_8$ are hydrogen, alkyl, aryl, aralkyl or, taken together with the nitrogen, form a piperazine, pyrrolidine, morpholine or piperidine ring, is heated with an equivalent amount of compound of structure III

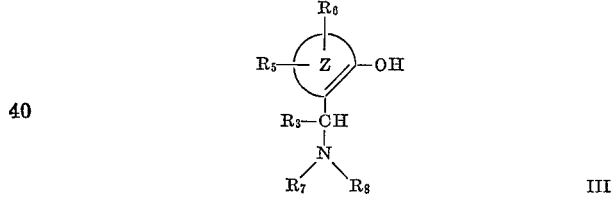

III

The compounds are refluxed in dioxane or other solvent at a temperature of 70–95° until no by-product of formula $$HN{<}^{R_7}_{R_8}$$

is detectable in the reaction fumes by smell or pH measurements. At this point water is added and the mixture is heated at a temperature of 90–98° C. for 1 hour. The addition of water is omitted in the case when $R_4$ in the final product is an amine such as dilower alkylamine, pyrrolidine, piperazine, piperidine or morpholine.

PROCEDURE B

Procedure B involves the reaction of a compound of structure IV with a compound of structure III without solvent a ca. 150° C.

Procedure B is limited to those cases wherein the final product $R_4$ is not an amine.

The starting phenolic Mannich bases are prepared according to procedures cited in "α-Aminoalkylierung" by H. Hellmann and G. Opitz, Verlog Chemie G.m.b.H., Weinheim, Germany, 1960.

The 2-ketoquinolizidines are prepared according to Rhodes and Soine J. A. Ph. Assoc. 45, 746 (1956). They are converted to enamines by standard methods such as described by G. Stork et al., J. Am. Chem. Soc. 85, 207 (1963).

In order to further illustrate this invention, the following examples are given. All temperatures are given in ° C.

EXAMPLE 1

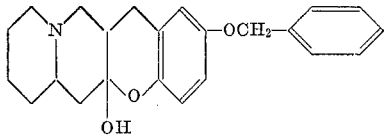

2-(benzyloxy)-6,6a,7,8,9,10,12a,13 - octahydro - 5aH, 12H-[1]benzopyrano[2,3-b]quinolizin-5a-ol. — A solution of 5.14 g. of 4-benzyloxy-a-dimethylamino-o-cresol, and 4.12 g. of pyrrolidine enamine of quinolizin-2-one in 20 ml. of dioxane was refluxed under a stream of nitrogen for 2 days. The mixture was treated with 5 ml. of $H_2O$, and refluxed for 2 hours. The crystalline precipitate that formed was filtered, and recrystallized from absolute ethanol to give 2-(benzyloxy)-6,6a,7,8,9,10,12a,13-octahydro-5aH, 12H-[1]benzopyrano[2,3-b]quinolizin - 5a-ol, M.P. 183-84.5°; yield 2 g. (27%) λ max. mμ (e) 227 (10,000), 290 (3,600); γ max 685 (m.), 725 (m.s.), 820 (m.w.), 940 (m.), 985 (m.s.), 1025 (m.s.), 1100 (m.), 1220 (s.), 1500 (s.), cm.$^{-1}$.

Analysis.—Calcd. for $C_{23}H_{27}NO_3$ (percent): C, 75.59; H, 7.45; N, 3.83. Found (percent): C, 75.50; H, 7.46; N, 3.70.

EXAMPLE 2

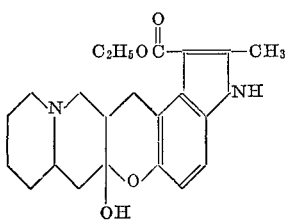

Ethyl 3,7,7a,8,9,10,11,13,13a,14 - decahydro - 6a - hydroxy-2 - methyl - 6aH - indolo [4′,5′;5,6]pyrano[2,3-b]quinolizine - 1 - carboxylate.—A solution of 7.75 g. of ethyl 4-[(dimethylamino)methyl]-5-hydroxy - 2 - methylindole-3-carboxylate, and 5.8 g. of pyrrolidine enamine of 2-ketoquinolizidine in 30 ml. of dioxane was refluxed under a stream of nitrogen for 3 hours. The solution was treated with 5 ml. of $H_2O$ and refluxed for 1.5 hours. Removal of the solvents under reduced pressure left a semi-crystalline residue which was recrystallized from absolute ethanol, to give ethyl 3,7,7a,8,9,10,11,13,13a,14-decahydro - 6a - hydroxy - 2 - methyl-6aH-indolo[4′,5′;5,6]pyrano[2,3-b]quinolinzine-1-carboxylate, M.P. 240–43°; yield 3 g. (28%); λ max. mμ (e) 217, (30,200); 247 (22,800); 282 (9,900); γ max. 750 (m.), 810 (m.), 970 (m.), 1025 (m.s), 1085 (m.s.), n65 (m.s.), 1235 (m.s.), 1660 (s.), 3300 (m.s.), cm.$^{-1}$.

Analysis.—Calcd. for $C_{22}H_{28}N_2O_4$ (percent): C, 68.73; H, 7.34; N, 7.29. Found (percent): C, 68.75; H, 7.23; N, 7.07.

EXAMPLE 3

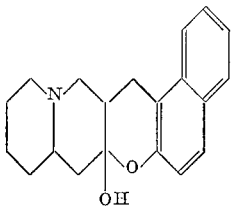

8,8a,9,10,11,12,14a,15-octahydro - 7aH, 14H - naphtho [1′,2′;5,6]pyrano[2,3-b]quinolizin-7a-ol.—A solution of 5 g. of 1-dimethyl aminomethyl-2-naphthol, and 5 g. of pyrrolidine enamine of quinolizin-2-one in 25 ml. of dioxane was refluxed for 3 hours under a stream of nitrogen. The solution was treated with 5 ml. of $H_2O$, and refluxed one hour. The solvents were removed under reduced pressure and the residual gum was recrystallized from $CH_3CN$, to give 8,8a,9,10,11,12,14a,15-octahydro-7aH, 14H-naphtho[1′,2′;5,6]pyrano[2,3-b]quinolizin - 7a - ol, M.P. 189–91°; yield 2 g. (26%); λ max. mμ (e) 232 (84,100), 267 (4,100), 277 (5,100), 288 (3,800), 317 (1,800), 331 (2,100); γ max. 73 (m.), 810 (m.), 945 (m.), 985 (s.), 1020 (m.), 1150 (m.), 1220 (m.s.), 1510 (m.w.), 1595 (m.), 1620 (m.w.) cm.$^{-1}$.

Analysis.—Calcd. for $C_{20}H_{23}NO_2$ (percent): C, 77.64; H, 7.49; N, 4.53. Found (percent): C, 77.85; H, 7.63; N, 4.45.

It is understood that the foregoing detailed description is given merely by way of illustration and that many variations may be made therein without departing from the spirit of our invention.

Having described our invention, what we desire to secure by Letters Patent is:

1. A compound of the formula:

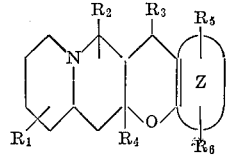

wherein $R_1$, $R_2$ and $R_3$ are hydrogen, $R_4$ is hydroxy, Z is benzene, or naphthalene, $R_5$ and $R_6$ are hydrogen or benzyloxy.

2. The compound of claim 1 which is 2-(benzyloxy)-6,6a,7,8,9,10,12a,13-octahydro - 5aH, 12H-[1]benzopyrano[2,3-b]quinolizin-5a-ol.

3. The compound of claim 1 which is 8,8a,9,10,12,14a, 15-octahydro-7aH, 14H-naphtho[1′,2′;5,6]pyrano[2,3-b] quinolizin-7a-ol.

References Cited
UNITED STATES PATENTS 3,272,707  9/1966  Tedeschi _____ 260—289

ALEX MAZEL, Primary Examiner

J. H. TURNIPSEED, Assistant Examiner

U.S. Cl. X.R.

260—247.2, 247.5, 247.7, 268, 287, 288, 289, 294.7; 424—267